United States Patent
Gustafson et al.

(10) Patent No.: US 9,422,783 B2
(45) Date of Patent: Aug. 23, 2016

(54) STABILIZED VALVE

(71) Applicant: Hydril USA Distribution, LLC, Houston, TX (US)

(72) Inventors: Ryan Gustafson, Houston, TX (US); Matthew Goode, Houston, TX (US); Parker Bailey, Houston, TX (US)

(73) Assignee: Hydril USA Distribution, LLC, Houston, TX (US)

( * ) Notice: Subject to any disclaimer, the term of this patent is extended or adjusted under 35 U.S.C. 154(b) by 232 days.

(21) Appl. No.: 14/015,487

(22) Filed: Aug. 30, 2013

(65) Prior Publication Data

US 2014/0061516 A1    Mar. 6, 2014

Related U.S. Application Data

(60) Provisional application No. 61/695,208, filed on Aug. 30, 2012.

(51) Int. Cl.
| | |
|---|---|
| *F16K 11/044* | (2006.01) |
| *F15B 13/042* | (2006.01) |
| *E21B 33/064* | (2006.01) |
| *E21B 33/035* | (2006.01) |
| *F16K 31/122* | (2006.01) |
| *F16K 3/24* | (2006.01) |
| *F16K 11/07* | (2006.01) |

(52) U.S. Cl.
CPC ............ *E21B 33/064* (2013.01); *E21B 33/0355* (2013.01); *F16K 3/246* (2013.01); *F16K 11/07* (2013.01); *F16K 31/122* (2013.01)

(58) Field of Classification Search
CPC . F16K 31/124; F16K 31/1223; F16K 31/246; E21B 34/04

USPC .............................. 137/625.2, 625.6, 625.49
See application file for complete search history.

(56) References Cited

U.S. PATENT DOCUMENTS

| | | | |
|---|---|---|---|
| 3,285,287 A | | 11/1966 | Curran |
| 3,367,355 A | * | 2/1968 | Anderson ..................... 137/209 |
| 3,460,614 A | | 8/1969 | Burgess |
| 3,736,958 A | * | 6/1973 | Rostad ........................ 137/625.6 |

(Continued)

FOREIGN PATENT DOCUMENTS

| | | |
|---|---|---|
| EP | 2604787 A1 | 6/2013 |
| GB | 2104991 A | 3/1983 |

(Continued)

OTHER PUBLICATIONS

PCT Search Report and Written Opinion issued Jun. 25, 2014 in connection with corresponding PCT Patent Application No. PCT/US2013/057570.

*Primary Examiner* — Marina Tietjen
*Assistant Examiner* — Seth W Mackay-Smith
(74) *Attorney, Agent, or Firm* — Bracewell LLP; James E. Bradley; Taylor P. Evans

(57) ABSTRACT

An SPM valve for use in a subsea environment includes a spool selectively movable between first and second positions to thereby arrange the valve in respective armed and disarmed configurations. The particular arrangement of a supply port and discharge port with respect to the spool permits a pressurized working fluid supplied to the supply port to bias the spool to both the first and second positions once an external force is applied to the spool to initially set the spool in either the first or second position.

12 Claims, 2 Drawing Sheets

(56) References Cited

U.S. PATENT DOCUMENTS

| | | | |
|---|---|---|---|
| 3,921,660 A | 11/1975 | Kowalski | |
| 4,188,976 A * | 2/1980 | Austin, Jr. | 137/637.1 |
| 4,475,568 A | 10/1984 | Loup | |
| 4,817,669 A | 4/1989 | Barrier et al. | |
| 4,887,643 A | 12/1989 | Tomlin et al. | |
| 4,964,273 A | 10/1990 | Nash | |
| 5,042,530 A * | 8/1991 | Good et al. | 137/625.64 |
| 5,398,761 A | 3/1995 | Reynolds et al. | |
| 5,771,931 A | 6/1998 | Watson | |
| 5,778,918 A | 7/1998 | McLelland | |
| 6,328,070 B2 | 12/2001 | Clayton et al. | |
| 6,655,405 B2 | 12/2003 | Hollister et al. | |
| 6,779,543 B2 | 8/2004 | Hollister et al. | |
| 7,124,778 B2 | 10/2006 | Miyazoe et al. | |
| 7,819,386 B2 | 10/2010 | Combs | |
| 8,393,399 B2 | 3/2013 | Judge | |
| 2013/0146303 A1 | 6/2013 | Gustafson | |

FOREIGN PATENT DOCUMENTS

| | | |
|---|---|---|
| GB | 2115906 A | 9/1983 |
| GB | 2318406 A | 4/1998 |
| WO | 2008096170 A1 | 8/2008 |

* cited by examiner

STABILIZED VALVE

RELATED APPLICATION

This application is a non-provisional of and claims the benefit of and priority to U.S. Provisional Patent Application No. 61/695,208 titled "Stabilized Valve" filed Aug. 30, 2012, which is incorporated herein by reference in its entirety.

BACKGROUND

1. Field of Invention

The present invention relates generally valves which are operable to control the flow of pressurized fluids to a blowout preventer in offshore oil or gas wells. In particular, the invention relates to a sub plate mounted (SPM) valve that is selectively movable between an armed configuration and a disarmed configuration, and is adapted for maintaining operable stability in both the armed and disarmed configuration.

2. Description of Related Art

Valves used in hydrocarbon recovery operations include SPM valves for controlling the flow of pressurized fluid to a blowout preventer. Although these valves are typically referred to as sub plate mounted valves, the particular mounting position for these valves may vary between applications.

Various types of SPM valves have been developed including 2-way and 3-way valves. One common design for SPM valves includes a valve housing with an open interior defining a longitudinal axis. The open interior is fluidly communicable with a supply port, a discharge port, and often with a vent port as well. A spool is selectively movable through the open interior, along the longitudinal axis, to control fluid flow between the supply port and the discharge port. The spool can be moved to a first position within the open interior wherein fluid is permitted to flow between the supply port and the discharge port thereby arranging the valve in an "armed" configuration. The spool can also be moved to a second position within the open interior where fluid is prevented from flowing between the supply port and the discharge port thereby arranging the valve in a "disarmed configuration." Thus the valve is operable to arm and disarm hydraulic circuits, which may include additional valves for operating the ram of a blowout preventer.

Many of the valves of this type include springs to bias the spool to one of the first and second positions. The spool is generally movable to the other of the first and second positions by providing a pilot pressure to a pilot port of the valve. Other valves are double-piloted and require a pilot pressure to be maintained at one of two pilot ports to maintain the spool in a particular position within the open interior. Fluid flowing through the spool of these valves often serves to counteract the spring bias or the pilot pressure, and thus, the spool can be unstable and shift to an unintended position.

SUMMARY OF EMBODIMENTS OF THE INVENTION

A valve is described that employs a working fluid to maintain the valve in a particular configuration, e.g., either armed or disarmed, once the valve has been moved to the particular configuration. A supply port of the valve is arranged to provide a pressurized working fluid such that a spool of the valve is biased by the working fluid to a first position when the valve is moved to an armed configuration and such that the spool biased by the working fluid to a second position when the valve is moved to the disarmed configuration.

In accordance with an embodiment of the present disclosure, a valve for use as an sub plate mounted valve in a subsea environment includes a valve body having an upper end, a lower end and an interior cavity therein. The interior cavity defines a longitudinal axis. A supply port extends laterally through the valve body and is fluidly communicable with the interior cavity. An upper valve seat is disposed within the interior cavity, and a lower valve seat is disposed within the interior cavity. A discharge port extends axially through the lower end of the valve body and the lower valve seat. The discharge port is fluidly communicable with the interior cavity. A spool is disposed within the interior cavity and is selectively movable between a first position wherein the spool is engaged with the upper valve seat to permit fluid flow between the supply port and the discharge port and a second position wherein the spool is engaged with the lower valve seat to prohibit fluid flow between the supply port and the discharge port.

In some embodiments, the spool includes an upward facing shoulder on an external side thereof such that fluid pressure applied to the upward facing shoulder biases the spool toward the second position. In some embodiments, the valve further includes an arming pilot port and a disarming pilot port, wherein fluid pressure applied to the arming pilot port urges the spool toward the first position and wherein fluid pressure applied to the disarming pilot port urges the spool toward the second position. In some embodiments, the valve further includes a valve stem coupled to spool, and the valve stem includes a head having a downward facing surface in fluid communication with the arming pilot port and an upward facing surface in fluid communication with the disarming pilot port. In some embodiments, the valve stem extends into an interior of the spool, such that fluid pressure within the spool biases the valve stem toward the upper valve seat.

In some embodiments, the valve further includes a vent port extending laterally through the valve body, wherein the vent port is in fluid communication with the discharge port through the spool when the spool is in the second position and wherein the vent port is fluidly isolated from the discharge port when the spool is in the first position. In some embodiments, the valve further includes a spool seal disposed radially about the spool and axially between the supply port and the vent port, wherein the spool seal is operable to prevent fluid flow around an outer diameter surface of the spool between the vent port and the supply port. In some embodiments, the supply port is fluidly coupled to a supply of a pressurized working fluid, and the discharge port is fluidly coupled to a trigger valve that is operable to control fluid pressure to a ram of a blowout preventer. In some embodiments, the discharge port is fluidly coupled directly to the ram of a blowout preventer to control operation of the blowout preventer. In some embodiments, the spool defines an upper sealing face for engagement with the upper valve seat, and the upper sealing face includes an outward and upward facing surface, and the spool defines a lower sealing face for engagement with the lower valve seat, and the lower sealing face includes an inward and downward facing surface.

A method of controlling fluid flow in subsea environment includes the steps of supplying a pressurized working fluid to the supply port, applying a fluid pressure to the arming pilot port to induce movement of the spool to the first position such that a flow of working fluid between the supply port and the discharge port is established; and relieving the fluid pressure from the arming pilot port such that the flow of the working fluid maintains the spool in the first position.

In some embodiments, the method further includes the steps of applying a fluid pressure to the disarming pilot port to induce movement of the spool to the second position such that the flow of working fluid between the supply port and the discharge port is interrupted, and relieving the fluid pressure from the disarming port such that the working fluid applies a three to an exterior of the spool to maintain the spool in the second position.

In accordance with another embodiment of the present disclosure, a valve for use in a subsea environment includes a valve body defining an interior cavity therein and a longitudinal axis. A first valve seat is disposed at a discharge end of the interior cavity, and a second valve seat is disposed at a pilot end of the interior cavity opposite the discharge end of the interior cavity. A supply port extends laterally through the valve body and is fluidly communicable with the interior cavity. A discharge port extends axially through the first valve seat, and a spool is disposed within the interior cavity. The spool is selectively movable between a first position wherein the spool is axially spaced from the first valve seat such that a fluid flow path is defined between the supply port and the discharge port extending along an exterior of the spool and a second position wherein the spool is axially engaged with the first valve seat, and wherein a sealing face of the spool circumscribes the discharge port such that the flow path is obstructed by the spool.

In some embodiments, the spool includes an upward facing shoulder on an external side thereof, such that fluid pressure applied to the upward facing shoulder biases the spool toward the second position. In some embodiments, the valve further includes a spool seal disposed radially about the spool and axially between the upward facing shoulder and the second valve seat. The spool seal is operable to contain a pressurized fluid in an annular region around the upward facing shoulder when the spool is in the second position. In some embodiments, the supply port is fluidly isolated from an interior of the spool when the spool is in the second position.

In some embodiments, the valve farther includes a vent port extending laterally through the valve body, wherein the vent port is in fluid communication with the interior of the spool when the spool is in the second position. In some embodiments, the vent port is exposed to a fluid at an ambient pressure, and the supply port is exposed to a working fluid at a higher pressure than the ambient pressure.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only preferred embodiments of the invention and are therefore not to be considered limiting of its scope as the invention may admit to other equally effective embodiments.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning well drilling, running operations, and the like have been omitted inasmuch as such details are not considered necessary to obtain a complete understanding of the present invention, and are considered to be within the skills of persons skilled in the relevant art.

Figure 1:
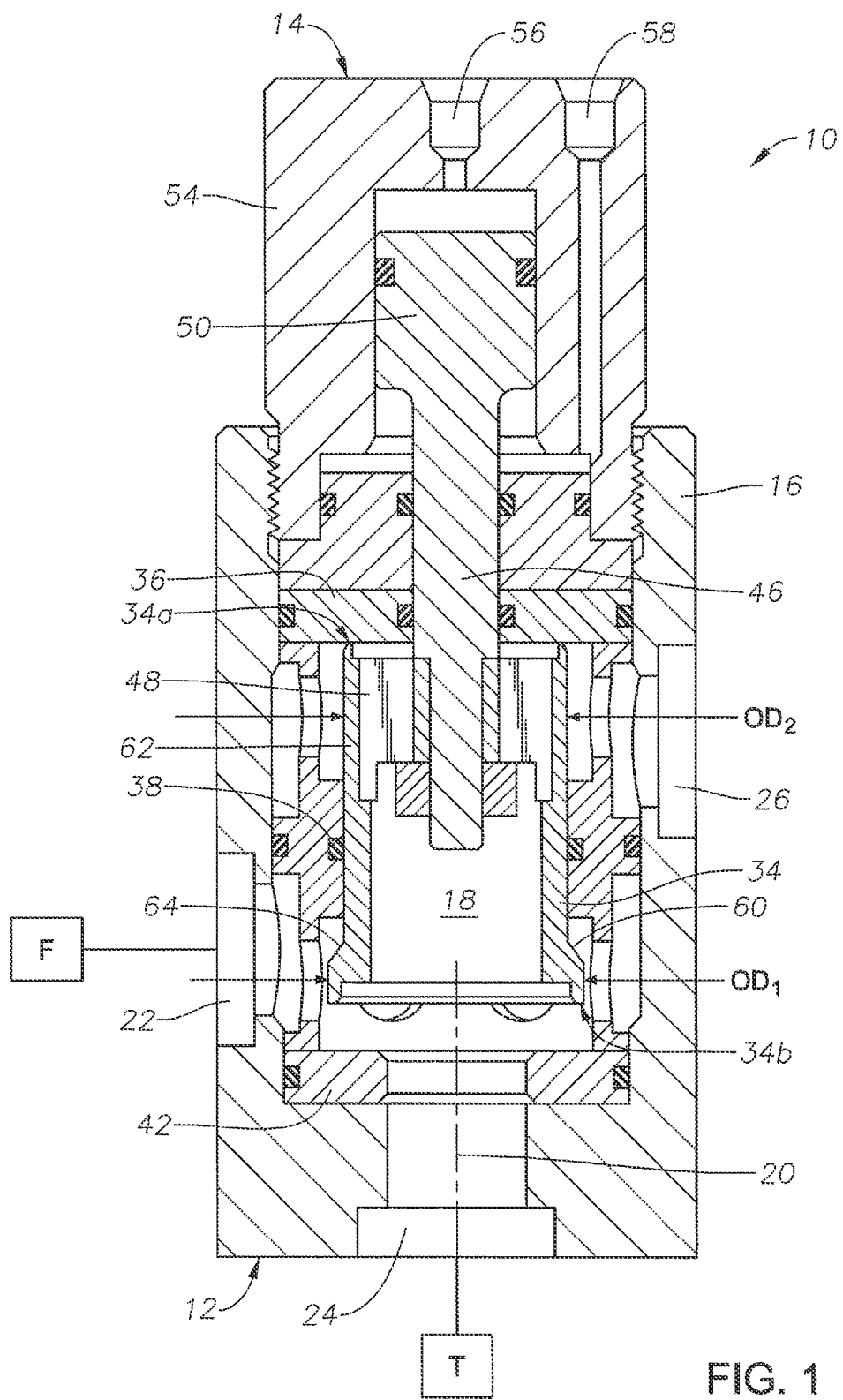
FIG. 1 is a cross-sectional side view of a stabilized valve arranged in an armed configuration and including a spool movable between first and second positions in accordance with an example embodiment of the present disclosure.

Referring to FIG. 1, valve 10 is a stabilized SPM valve that employs a working fluid "F" to maintain a configuration of valve 10. Valve 10 does not rely on springs or a pilot pressure to maintain either armed or disarmed configurations once valve 10 is properly arranged in the particular configuration. For purposes of this description, valve 10 is described as including a lower end 12 (a discharge end) and an upper end 14 (a pilot end). The use of "lower" and "upper" herein is to aid in understanding of the invention and does not indicate any specific orientation or position.

Valve 10 includes a valve body 16 defining an interior cavity 18 with longitudinal axis 20 defined therethrough. Supply port 22, discharge port 24 and vent port 26 are each defined through valve body 16 and are fluidly communicable with the interior cavity 18. Supply port 22 is fluidly connected to supply of pressurized working fluid "F," and extends laterally through valve body 16 to a lower end of interior cavity 18. Discharge port 24 is fluidly coupled to trigger valve "T," and extends from the lower end of interior cavity 18 axially through valve body 16. One skilled in the art will appreciate that that trigger valve "T" can be provided as part of a hydraulic circuit for controlling fluid pressure to a ram of a blowout preventer (not shown), and that valve 10 is thus employable to arm and disarm the hydraulic circuit. Alternatively, discharge port 24 of valve 10 can be directly coupled to the ram of a blowout preventer to control operation of the blowout preventer. Vent port 26 extends from an upper end of interior cavity 18 laterally through valve body 16, and in many applications is opened to the subsea environment defining an ambient pressure. Vent port 26 is an optional feature of valve 10 and is eliminated in some embodiments without departing from the concepts of the present invention. A pressure of the working fluid "F" is higher pressure than the ambient pressure.

Spool 34 is constructed as an elongated, annular member and is provided within interior cavity 18. Spool 34 is axially movable within interior cavity 18 to control a flow of working fluid "F" to and from various ports 22, 24, 26. Spool 34 is movable to a first position at an upper end of interior cavity 18, as illustrated FIG. 1, to arrange valve 10 in the "armed" configuration. When valve 10 is arranged in the armed configuration, working fluid "F" is permitted to flow from supply port 22, through interior cavity 18 of valve body 16, and exit valve 10 through discharge port 24. The flow of working fluid "F" through an open upper end of spool 34 is prevented by engagement of upper sealing face 34a of spool 34 with upper valve seat 36. Spool seal 38 is provided radially between spool 34 and valve body 16 and axially between supply port 22 and vent port 26 to prevent working fluid "F" from flowing around an outer diameter surface of spool 34 between vent port 26 and supply port 22. Spool seal 38 is configured as an annular "t-seal" circumscribing spool 34, and is operable to maintain sealing engagement with spool 34 throughout axial movements of spool 34 within interior cavity 18.

Figure 2:
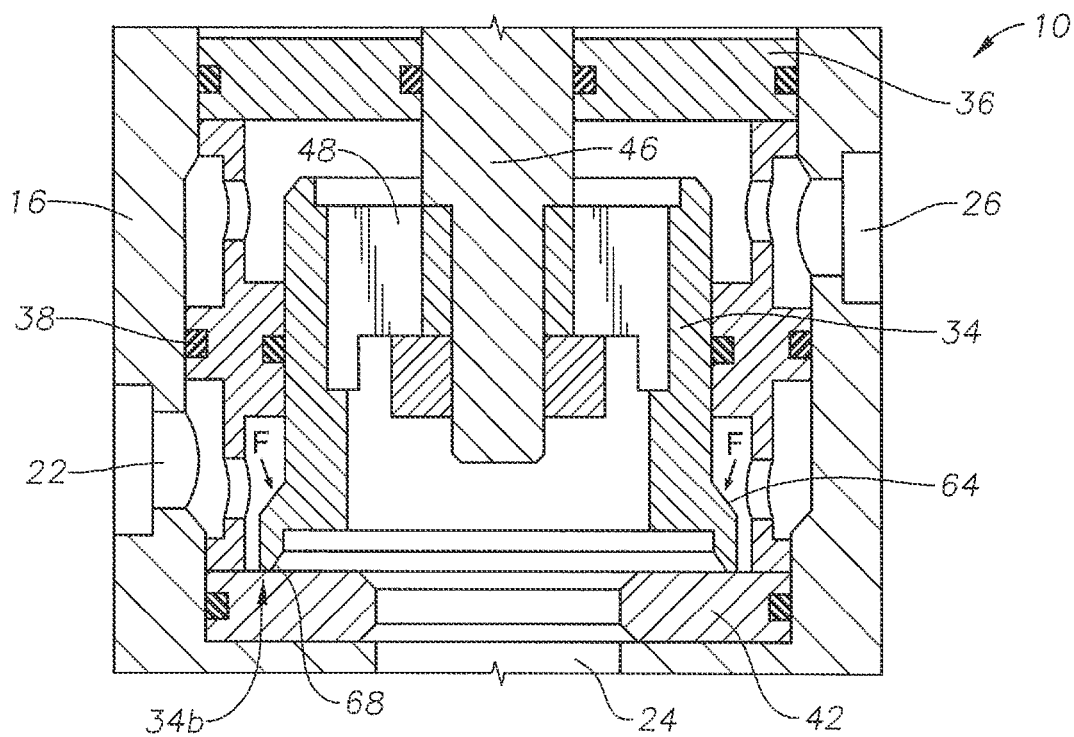
FIG. 2 is a schematic view of the stabilized valve of FIG. 1 illustrating forces applied to the spool by a working fluid when the valve is arranged in a disarmed configuration.

Spool 34 is movable to a second position at a lower end of interior cavity 18 to arrange valve 10 in the "disarmed" configuration (see FIG. 2). When valve 10 is arranged in the disarmed configuration, the flow working fluid "F" between supply port 22 and discharge port 24 is prevented by sealing engagement a lower sealing face 34b of spool 34 with lower valve seat 42. To engage the lower end of spool 34 with lower valve seat 42, spool 34 is moved axially away from upper valve seat 36. Thus, when valve 10 is in the disarmed configuration, fluid within spool 34 or discharge port 24 is permitted to flow over the upper end of spool 34 and exit valve 10 through vent port 26.

Valve stem 46 is provided to facilitate axial movement of spool 34. A lower end of valve stem 46 is coupled to spool 34 by radial fins 48 extending to an inner diameter surface of spool 34. Interstitial spaces defined between radial fins 48 permit the passage of fluids axially through spool 34. A head 50 defined at an upper end of valve stem 46 slidingly engages stem housing 54. Disarming pilot port 56 is in fluid communication with an upward facing surface 50a of bead 50 and arming pilot port 58 is in fluid communication with a downward facing surface 50b of head 50. A pilot pressure applied to disarming pilot port 56 urges head 50 in a downward direction toward lower end 12 of valve 10, and thus urges spool 34 into the second position in sealing engagement with lower valve seat 42. Conversely, a pilot pressure applied to arming pilot port 58 urges head 50 in a direction toward the upper end of valve 10, and thus urges spool 34 into sealing engagement with upper valve seat 36. Thus, by applying pilot pressure at the appropriate pilot port 56, 58, valve stem 46 can be manipulated to move spool 34 between the first and second positions and toggle valve 10 between the armed and disarmed configurations. In embodiments, no pilot pressure is required to be maintained at either pilot port 56, 58 to maintain valve 10 in either of the armed or disarmed configurations. Thus, once a pilot pressure is applied to one of the pilot ports 56, 58, to move spool 34 to one of the first and second positions, the pilot pressure may be relieved, and the particular armed or disarmed configuration of the valve achieved is maintained.

Shoulder 60 is provided the lower end of spool 34. An outer diameter $OD_1$ of shoulder 60 is greater than an outer diameter $OD_2$ of a body 62 of spool 34. Spool 34 tapers between $OD_1$ and $OD_2$ along outward and upward facing shoulder 64, which defines a transition between shoulder 60 and body 62. In alternate embodiments (not shown), a flat shoulder can be provided at lower end of spool 34.

Referring to FIG. 2, valve 10 is illustrated schematically in the disarmed configuration wherein lower sealing face 34b of spool 34 is sealingly engaged with lower valve seat 42. A relatively high surface area on an exterior of spool 34 is in contact with working fluid "F" since a greater axial length of spool 34 is disposed beneath spool seal 38. Lower sealing face 34b includes a sealing face taper 68, which is an inward and downward facing tapered surface. When valve 10 is in the disarmed configuration, the pressurized working fluid "F" applies a force on the exterior of spool 34, which includes upward facing shoulder 64. Spool seal 38 contains working fluid "F" in an annular region around upward facing shoulder 64 when spool 34 is in the second position. In this manner, the high pressure of the working fluid "F" presses lower sealing face 35b downward into lower valve seat 42. The working fluid "F" is isolated from the interior of spool 34, and thus, the high pressure does not act upon the sealing face taper 68 of the lower sealing face 34b when valve 10 is arranged in the disarmed configuration. The interior of spool 34 may be exposed to the relatively low pressure of the subsea environment through vent port 26. Thus, the working fluid "F" generates a pressure differential between the interior and exterior of spool 34, and thereby serves to urge spool 34 in the direction of lower valve seat 42 to maintain valve 10 the disarmed position.

Figure 3:
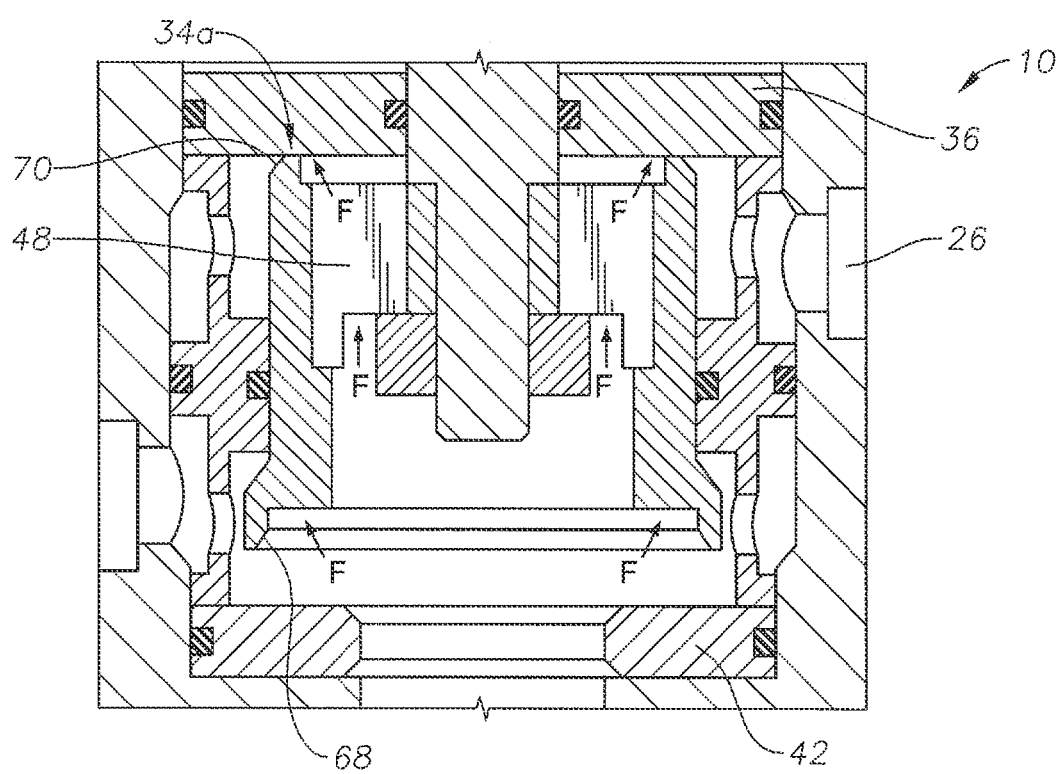
FIG. 3 is a schematic view of the of the stabilized valve of FIG. 1 illustrating forces applied to the spool by the working fluid when the valve is arranged in the armed configuration.

Referring to FIG. 3, valve 10 is illustrated schematically in the armed configuration wherein upper sealing face 34a of spool 34 sealingly engages upper valve seat 36. Upper sealing face 34a includes an upper sealing face taper 70, which is an outward and upward facing tapered surface. When valve 10 is arranged in the armed configuration, the working fluid "F" is permitted to flow into the interior of spool 34, and thus the relatively high pressure of the working fluid "F" acts on the interior of spool 34 to press upper sealing face 34a upward into upper valve seat 36. Fins 48, valve stem 46, sealing face taper 68 are all exposed to the relatively high pressure of the working fluid "F." The pressure of the working fluid acting on these elements serves to bias spool 34 toward the upper valve seat 36. The working fluid "F" is isolated from the exterior of spool 34 at the upper sealing face 34a, and thus the relatively high pressure of the working fluid. "F" does not act upon the upper sealing face taper 70 of the upper sealing face 34a when valve 10 is in the armed configuration. The working fluid "F" again generates a pressure differential, and thereby serves to urge spool 34 in the direction of upper valve seat 36 to maintain valve 10 the armed configuration.

As illustrated in FIG. 3, supply port 22 is arranged with respect to discharge port 24 and spool 34 such that spool 34 can be axially spaced from lower valve 42 when valve 10 is arranged in the armed configuration. Since discharge port 24 extends axially through lower valve seat 42, working fluid "F" is communicable between supply port 22 and discharge port 24 along a fluid flow path extending between spool 34 and lower valve seat 42 as indicated by arrows 72. The fluid flow path is defined exclusively on an exterior of spool 34, and thus, it is not necessary for working fluid "F" to flow axially through spool 34 when valve 10 is arranged in the armed configuration.

It is understood that the present invention may take many forms and embodiments. Accordingly, several variations may be made in the foregoing without departing from the spirit or scope of the invention. Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A valve for use as a sub plate mounted valve in a subsea environment, the valve comprising:
   a valve body defining an upper end, a lower end and an interior cavity therein, the interior cavity defining a longitudinal axis;
   a supply port extending laterally through the valve body and fluidly communicable with the interior cavity for supplying working fluid to the interior cavity;
   an upper valve seat disposed within the interior cavity;
   a lower valve seat disposed within the interior cavity;
   a discharge port extending axially through the lower end of the valve body and the lower valve seat, the discharge port fluidly communicable with the interior cavity for discharging working fluid from the interior cavity;
   a spool disposed within the interior cavity and selectively movable between an upper position wherein the spool is engaged with the upper valve seat to permit working fluid flow between the supply port and the discharge port and a lower position wherein the spool is engaged with the lower valve seat to prohibit working fluid flow between the supply port and the discharge port;
   a valve stem housing extending axially from the valve body, the valve stem housing having a piston chamber;
   a valve stem having a lower end that extends through a sealed opening into an interior of the spool, and a piston on an upper end of the valve stem and carried in the piston chamber;
   a down stroke pilot port extending into the piston chamber above the piston for providing a pilot down stroke fluid pressure to move the piston downward and the spool to the lower position;
   an upstroke pilot port extending into the piston chamber below the piston for providing a pilot up stroke fluid pressure to move the piston upward and the spool to the upper position; wherein
   the stem is free of any spring biasing the stem either upward or downward;
   the spool is configured to remain in the upper position in response to working fluid pressure in the interior of the spool once in the upper position in the absence of pilot up stroke fluid pressure;
   the spool is configured to remain in the lower position in response to working fluid pressure on an exterior of the spool once in the lower position in the absence of pilot down stroke fluid pressure; wherein the valve further comprises:
   a plurality of fins within the spool through which the stem extends; and
   an upper counterbore in the interior of the spool that extends downward from the upper end of the spool and has a lower end no lower than upper ends of the fins, to assist in retaining the spool in the upper position once in the upper position.

2. The valve of claim 1 wherein the spool includes an upward facing shoulder on an external side thereof such that working fluid pressure in the interior cavity applied to the upward facing shoulder while the spool is in the lower position biases the spool to remain in the lower position.

3. The valve of claim 1, further comprising a vent port extending laterally through the valve body, wherein the vent port is in fluid communication with the discharge port through the spool when the spool is in the lower position and wherein the vent port is fluidly isolated from the discharge port when the spool is in the upper position.

4. The valve of claim 3, further comprising a spool seal disposed radially about the spool and axially between the supply port and the vent port, the spool seal operable to prevent fluid flow around an outer diameter surface of the spool between the vent port and the supply port.

5. The valve of claim 1, wherein the discharge port is either fluidly coupled to a trigger valve that is operable to control working fluid pressure to a ram of a blowout preventer or directly coupled to the ram of a blowout preventer to control operation of the blowout preventer.

6. The valve of claim 1, further comprising:
   a lower counterbore within the spool that extends upward from the lower end of the spool, defining a downward facing shoulder that is in a plane perpendicular to an axis of the stem.

7. A method of controlling fluid flow in subsea environment, the method comprising the steps of:
   providing a valve with an axis, a supply port, a discharge port, a spool axially movable between a closed position blocking flow of working fluid from the supply port to the discharge port and an open position allowing working fluid to flow from the supply port to the discharge port and into an interior of the spool, a piston chamber, a valve stem having one end connected to the spool and a piston on an opposite end that is carried in the piston chamber, the valve stem being free of any spring biasing the spool to the closed position;
   applying opening pilot fluid pressure to the piston, causing the spool to move axially to the open position with a first end of the spool in engagement with a first seat;
   while in the open position, biasing the spool in the open position with pressure of the working fluid within the interior of the spool, causing the spool to remain in the open position in the event the opening pilot fluid pressure to the piston ceases;
   applying closing pilot fluid pressure to the piston, causing the spool to move axially from the open position to the closed position with a second end of the spool in engagement with a second seat;
   while in the closed position, biasing the spool in the closed position with pressure of the working fluid on the exterior of the spool, causing the spool to remain in the closed position in the event the closing pilot fluid pressure ceases; and wherein providing the valve further comprises:
   providing a plurality of fins within the spool through which the valve stem extends, each of the fins having a first end spaced from the first end of the spool and a second end spaced from the second end of the spool; and
   a counterbore in the interior of the spool that extends into the spool from the first end of the spool a distance that is no greater than a distance from the first ends of the fins to the first end of the spool, to assist in retaining the spool in the open position once in the open position.

8. A valve for use in a subsea environment, the valve comprising:
   a valve body and housing defining an interior cavity therein and a longitudinal axis;
   a first valve seat disposed at a pilot end of the interior cavity;
   a second valve seat disposed at a discharge end of the interior cavity opposite the pilot end of the interior cavity;
   a supply port extending laterally through the valve body and fluidly communicable with the interior cavity for supplying working fluid to the interior cavity;

a discharge port extending axially through the second valve seat for discharging working fluid from the interior cavity;

a spool disposed within the interior cavity and selectively movable between:

an open position wherein a first end of the spool is in contact with the first valve seat such that a working fluid flow path is defined along an exterior of the spool between the supply port and the discharge port;

a closed position wherein a second end of the spool is in contact with the second valve seat, and wherein a sealing face of the spool circumscribes the discharge port such that the working fluid flow path is closed by the spool;

a valve stem that extends through a sealed opening into the spool and is secured to the spool with a plurality of fins in the interior cavity of the spool, the valve stem having a pilot piston within the pilot piston chamber;

a pilot fluid closing port leading to the pilot piston chamber to supply closing pilot fluid pressure to move the pilot piston, the stem, and the spool to the closed position;

a pilot fluid opening port leading to the pilot piston chamber to supply opening pilot fluid pressure to move the pilot piston, the stem, and the spool to the open position; wherein the valve is free of any spring in engagement with the stem;

external pressure area means on the exterior of the spool for causing working fluid pressure on the exterior of the spool while the spool is in the closed position to cause the spool to remain in the closed position in the absence of closing pilot fluid pressure; and an internal counterbore in the spool extending from an end of the fins to the first end of the spool in an interior of the spool for causing working fluid pressure in the interior of the spool while the spool is in the open position to cause the spool to remain in the open position in the absence of opening pilot fluid pressure.

9. The valve of claim 8, wherein the external pressure area means comprises an external shoulder on the exterior of the spool that faces generally toward the first valve seat.

10. The valve of claim 9, further comprising a spool seal disposed radially about the spool and axially between the external shoulder and the first valve seat, the spool seal operable to contain a pressurized fluid in an annular region around the external shoulder when the spool is in the closed position.

11. The valve of claim 8, further comprising a vent port extending laterally through the valve body, wherein the vent port is in fluid communication with the interior of the spool when the spool is in the closed position.

12. The valve of claim 11, wherein the vent port is exposed to a fluid at an ambient pressure, and wherein the supply port is exposed to working fluid at a higher pressure than the ambient pressure.

* * * * *